H. HARDING.
CUSHIONING DEVICE.
APPLICATION FILED FEB. 5, 1912.
1,046,589.
Patented Dec. 10, 1912.
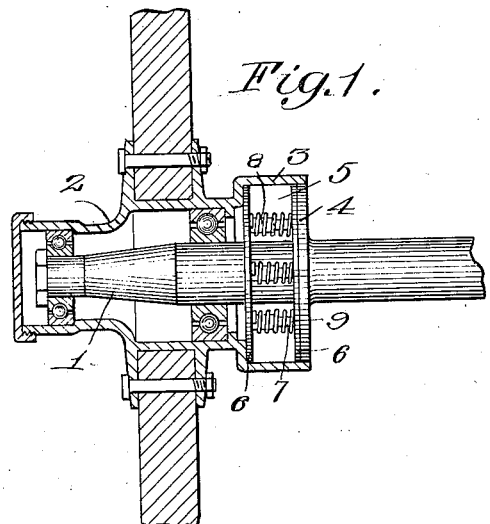
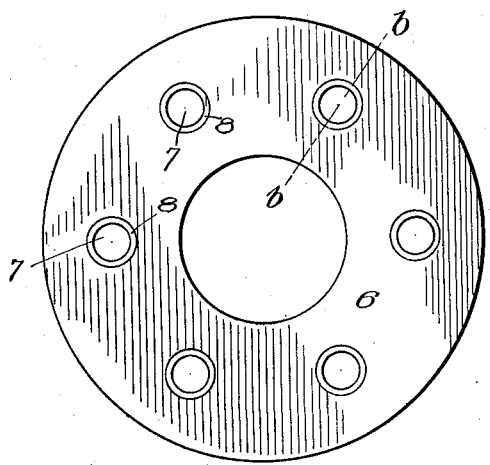
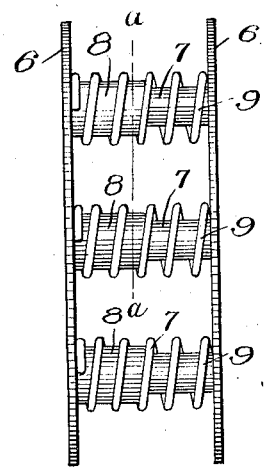
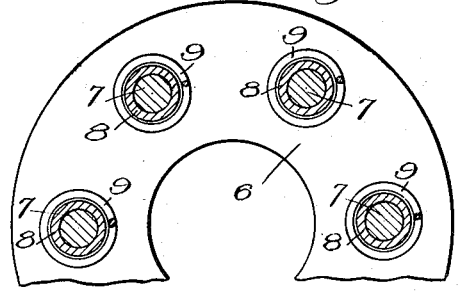
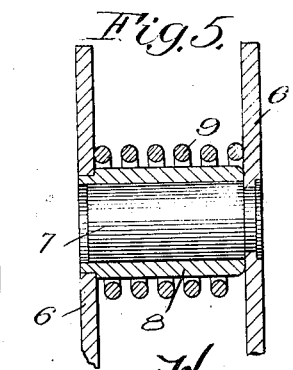
Witnesses
Le Roy M. Simms
Ada M. Whitmore
Inventor
Harry Harding
By J. H. H. Simms
his Attorney

UNITED STATES PATENT OFFICE.

HARRY HARDING, OF ROCHESTER, NEW YORK.

CUSHIONING DEVICE.

1,046,589.  Specification of Letters Patent.  Patented Dec. 10, 1912.

Application filed February 5, 1912. Serial No. 675,610.

*To all whom it may concern:*

Be it known that I, HARRY HARDING, of Rochester, in the county of Monroe and State of New York, have invented a new and useful Improvement in Cushioning Devices, which improvement is fully set forth in the following specification and shown in the accompanying drawings.

The present invention relates to devices for cushioning the axial thrust of vehicle wheels or the like, and an object of the invention is to provide a simple and inexpensive construction which may be easily replaced and repaired while at the same time not occupying much space in its installed position.

To these and other ends the invention consists in certain parts and combinations of parts all of which will be hereinafter described, the novel features being pointed out in the appended claims.

In the drawings: Figure 1 is a sectional view showing the device mounted in position to take up the axial thrust of a vehicle wheel upon its axle; Fig. 2 is a face view of the device; Fig. 3 is a side view; and Figs. 4 and 5 are respectively detail sectional views on the lines *a—a* and *b—b* of Figs. 3 and 2 respectively.

While the device, which may be termed a spring washer, has been designed for and is illustrated as mounted for taking up the axial thrust of a wheel on its axle, it is apparent that the device is capable of use in any place where a like condition exists.

In the drawings, 1 indicates the vehicle axle and 2 the wheel turning thereon and adapted for a slight axial movement relatively to the axle. The latter may be provided with a shoulder or collar 4 while the hub of the wheel 2 is provided with an annually formed flange 3 which fits about the collar on the axle and forms a chamber or pocket 5 for the reception of the device. It is apparent that it is not necessary to this invention that the wheel turn on the axle, as any construction in which the wheel moves axially relatively to the axle will serve the same function.

The spring washer, which is housed within the chamber 5 and thereby protected from dust, may comprise two annular or ring-shaped members or disks 6 having resilient means interposed between them, said disks surrounding the axle 1 and abutting both said axle and the wheel. Preferably the disks are guided for movement in parallel planes toward and from each other by means of telescoping posts comprising preferably male members 7 secured to one of the disks, and female members 8 secured to the other disk, said members coöperating to produce the telescopic action, and the ends of the members 8 coöperating with the disk, other than the one by which they are carried, to limit the movement of the disks toward each other. The resilient means in this instance is in the form of helical springs 9 surrounding the telescoping posts and abutting at their ends the disks 6. With this arrangement, the springs lie in an annular series surrounding the axle and it is possible by varying the strength of the springs to obtain any desired cushioning effect, the annular series permitting a maximum cushioning action to be obtained.

When this invention is applied to the wheels of an automobile or other vehicle, it is apparent that the shock produced in quickly turning corners will be reduced to a minimum and in this way the wear on the tires will also be reduced.

What I claim as my invention and desire to secure by Letters Patent is:—

1. The combination with an axle having a shoulder thereon, and a wheel hub having a pocket in one end thereof movable axially on the axle, of two disks surrounding the axle within the pocket, one of said disks abutting the shoulder of the axle and the other abutting the wheel hub, a plurality of posts projecting laterally from opposing faces of the disks, the posts of one disk telescoping within the posts of the other disk, and an annular series of coiled springs surrounding the posts and disposed about the axle.

2. A device for cushioning the axial thrust of a wheel, comprising a pair of annular disks, a plurality of posts projecting laterally from opposing faces of the disks, the posts of one disk telescoping within the posts of the other disk, and coil springs surrounding the telescoping posts with their ends abutting the disks.

HARRY HARDING.

Witnesses:
 HAROLD H. SIMMS,
 ADA M. WHITMORE.